United States Patent
Hoffmann

(10) Patent No.: US 11,047,296 B2
(45) Date of Patent: Jun. 29, 2021

(54) VALVE DEVICE FOR A TURBOCHARGER

(71) Applicant: ElringKlinger AG, Dettingen (DE)

(72) Inventor: Maximilian Hoffmann, Eurasburg (DE)

(73) Assignee: ElringKlinger AG, Dettingen (DE)

( * ) Notice: Subject to any disclaimer, the term of this patent is extended or adjusted under 35 U.S.C. 154(b) by 80 days.

(21) Appl. No.: 16/129,304

(22) Filed: Sep. 12, 2018

(65) Prior Publication Data

US 2019/0010864 A1    Jan. 10, 2019

Related U.S. Application Data

(63) Continuation of application No. PCT/EP2017/055612, filed on Mar. 9, 2017.

(30) Foreign Application Priority Data

Mar. 16, 2016 (DE) ...................... 10 2016 104 840.2

(51) Int. Cl.
| | |
|---|---|
| *F02B 37/18* | (2006.01) |
| *F02B 37/12* | (2006.01) |
| *F16F 1/32* | (2006.01) |

(52) U.S. Cl.
CPC ............ *F02B 37/186* (2013.01); *F02B 37/12* (2013.01); *F02B 37/18* (2013.01); *F02B 37/183* (2013.01); *F05D 2220/40* (2013.01); *F16F 1/32* (2013.01); *Y02T 10/12* (2013.01)

(58) Field of Classification Search
CPC ........ F02B 37/186; F02B 37/18; F02B 37/12; F02B 37/183; Y02T 10/144; F05D 2220/40; F16F 1/32
See application file for complete search history.

(56) References Cited

U.S. PATENT DOCUMENTS

| | | | |
|---|---|---|---|
| 9,080,504 B2 | 7/2015 | Doehler et al. | |
| 9,127,590 B2 | 9/2015 | Schoenherr et al. | |
| 2004/0144614 A1 | 7/2004 | Ookita et al. | |
| 2014/0131931 A1 | 5/2014 | Valembois | |
| 2015/0076756 A1 | 3/2015 | Imaizumi et al. | |

FOREIGN PATENT DOCUMENTS

| | | |
|---|---|---|
| DE | 10 2011 077 626 | 12/2012 |
| DE | 10 2011 054 695 | 4/2013 |
| JP | 2013-204495 | 10/2013 |

*Primary Examiner* — Audrey K Bradley
*Assistant Examiner* — Edward Bushard
(74) *Attorney, Agent, or Firm* — Womble Bond Dickinson (US) LLP

(57) ABSTRACT

A valve device for an exhaust-gas bypass path of a turbocharger, including: a plate-like valve element, movable between a closed position and an open position and which has a shaft, which is connected to a valve element carrier for limited movement in the shaft direction; a rotatably held spindle, to which the valve element carrier is fixedly connected; a valve seat for the valve element, which valve seat surrounds an exhaust-gas through-opening; and an annular sheet-metal spring element, which has an opening through which the valve element shaft extends, an outer ring region, an inner ring region, which is axially offset relative to the outer ring region and adjoins the spring element opening, and an annular transition region therebetween; the width of the spring element transition region being variable around the spring element opening such that the valve element can be adapted to the valve seat as easily as possible.

15 Claims, 9 Drawing Sheets

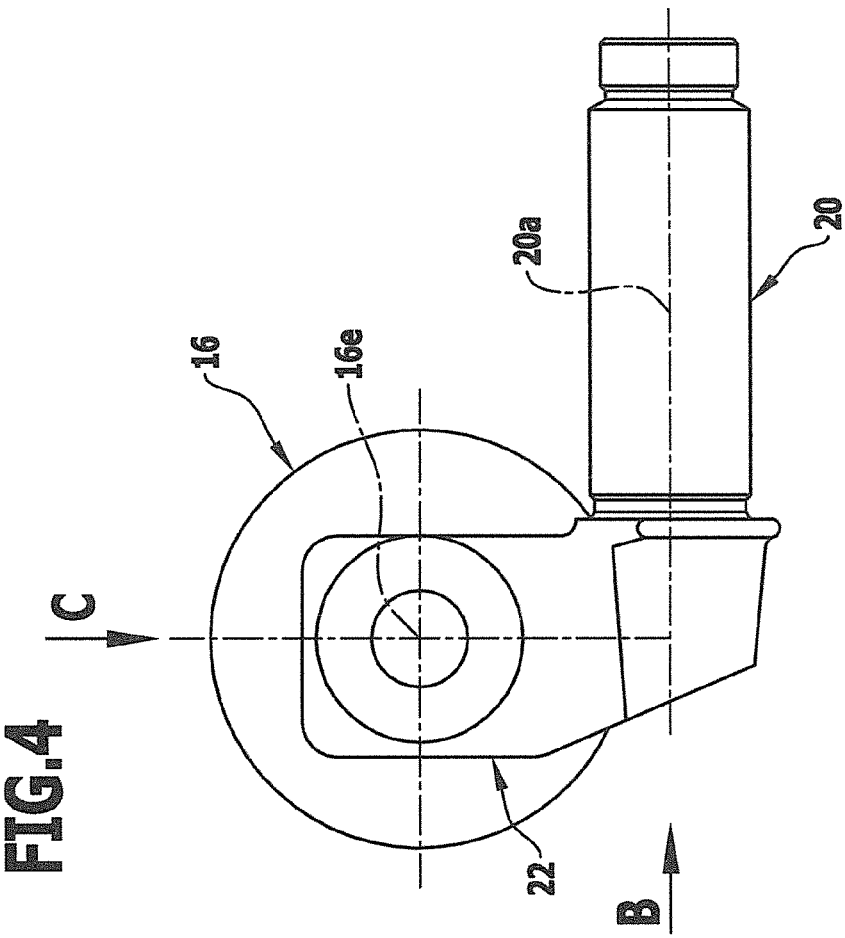
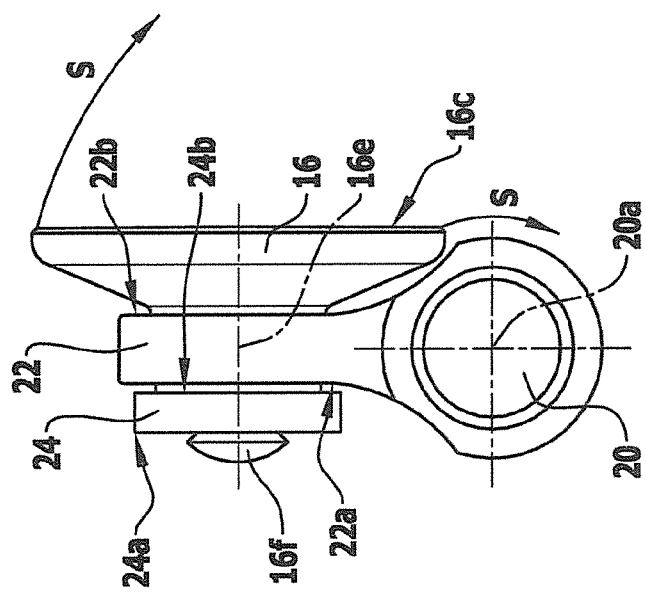

VALVE DEVICE FOR A TURBOCHARGER

CROSS-REFERENCE TO RELATED APPLICATIONS

This application is a continuation of International Patent Application No. PCT/EP2017/055612, filed Mar. 9, 2017, which claims priority to German Patent Application No. 10 2016 104 840.2, filed Mar. 16, 2016, which applications are hereby incorporated by reference in their entirety in this application.

BACKGROUND OF THE INVENTION

The invention relates to a valve device for an exhaust-gas bypass path of a turbocharger and has: a planar or plate-like valve element, which on one side thereof has a sealing surface and on the other side thereof has a shaft holding the valve element and is movable between a closed position and an open position; also a valve element carrier, to which the valve element is connected by means of its shaft, but nevertheless is movable to a limited extent relative to the valve element carrier in a direction perpendicular to the valve element sealing surface; furthermore a spindle, which is held (in particular in a wall of a turbocharger housing) so as to be rotatable about a spindle longitudinal axis and is fixedly connected to the valve element carrier, such that the valve element, by rotation of the spindle, can be moved between its closed position and its open position; a valve seat surrounding an exhaust-gas through-opening, which valve seat is held in a stationary manner, in particular in the turbocharger housing, and against which the valve element sealing surface bears in an at least substantially gastight manner with a sealing pressure in the closed position of the valve element; and lastly a substantially annular, in particular plate-like spring element produced from a sheet metal that is at least substantially resistant to the exhaust-gas temperatures, said spring element having an opening through which the valve element shaft extends.

During operation of a valve device of this kind, the valve element is moved from its open position to its closed position and vice versa by rotation of the spindle, and in so doing the valve element sealing surface is pivoted (tilted) about the spindle longitudinal axis, more specifically through a pivot angle range, the limits of which are determined by the open and closed positions of the valve element (here, the pivot angle range defines a pivot angle plane which extends perpendicularly to the spindle longitudinal axis and to the plane of the valve element sealing surface and in which the longitudinal axis of the valve element shaft lies). With respect to the axis of its opening and as considered in the direction of this axis, the spring element has a radially outer ring region and a radially inner ring region (adjoining the spring element opening) and also an annular transition region therebetween, such that the radially outer ring region is offset relative to the radially inner ring region in the direction of the axis of the spring element opening, whereby it is made possible to at least mostly eliminate play between the valve element and the valve element carrier (in the longitudinal direction of the valve element shaft) by the spring element.

A valve device of this kind is disclosed by DE 10 2012 101 322 A1 in the name of ElringKlinger AG, and further details of the valve device and of its setting in a turbocharger can be inferred from said document.

During operation of a turbocharger, it must be possible to reliably close the exhaust-gas bypass path thereof in any operating state and consequently also at any operating temperature of the turbocharger, which is not entirely without its problems, because the valve seat provided for the valve element is usually formed in an inner wall of the turbine housing exposed to significant temperature fluctuations and because the valve element held by the spindle by means of the valve element carrier performs a pivoting motion between its open position and its closed position, such that, on account of the significant temperature fluctuations occurring during turbocharger operation, but also on account of unavoidable manufacturing tolerances, it cannot be assumed that when the exhaust-gas bypass path is closed the valve element sealing surface is placed over its entire area against the valve seat simultaneously. The above-mentioned spring element is also required so that the valve element sealing surface can at all times be adapted to the sealing surface of the valve seat and in the closed position of the valve element is pressed against the valve seat with the sealing pressure necessary to close the exhaust-gas bypass path; due to the necessary adaptability of the valve element, the shaft thereof will extend through the spring element opening generally with a certain amount of play.

As will also be presented hereinafter, the forces exerted by the installed spring element onto the valve element during turbocharger operation must not be too great, because, in certain angular positions of the valve element, said valve element can be excited by the exhaust-gas flow to perform vibration-like movements, which during turbocharger operation lead to clattering and rattling noises, which are disadvantageous not only on account of the noise, but also on account of the wear caused by the rattling.

Since, in order to close the exhaust-gas bypass path, the entire area of the sealing surface of the valve element has to be placed against the valve seat in a sealing manner (that is to say the valve element must be able to adapt to the valve seat), for which purpose a zonally differing deformation of the spring element might be required for the reasons mentioned above, and since, with the actuation systems available on the market for rotation of the spindle, only limited forces or torques can be exerted, the spring element must not exert particularly large forces opposing the adaptation of the valve element to the valve seat. On the other hand, the spring element should damp the above-mentioned vibration-like movements of the valve element to the greatest possible extent, and, even after a significant operating period, that is to say a certain ageing, should eliminate play between the valve element and the valve element carrier as fully as possible; these are requirements on the spring element which conflict with the demand for a minimal application of force when the valve element is adapted to the valve seat. The following is noted in this regard:

The document already mentioned above DE 10 2012 101 322 A1 describes, for a valve device of the above-described kind, a circular ring-shaped sheet-metal spring element which has, as transition region between a radially outer and a radially inner, in each case circular ring-shaped ring region, a half bead that is likewise circular ring-shaped in a plan view of the spring element, the bead height of said half bead being equal to the axial offset of the radially inner ring region relative to the radially outer ring region. In the case of this spring element the axial rigidity or spring hardness is all the greater, the greater is the bead height of the half bead, wherein the height dimension of the spring element influences the deformation behavior of said spring element primarily during the first deformation cycle on account of the high operating temperatures of a turbocharger in the region of its wastegate valve (here, a deformation cycle is understood to mean the deformation of the spring element when the wastegate valve is moved from its open position into its closed position and back again into its open position). However, the installation space available for the spring element in the region of the wastegate valve in a turbocharger is usually strictly limited, more specifically both in the axial and radial direction of the spring element.

The problem addressed by the present invention was that of proposing a valve device of the kind defined in the introduction, which valve device makes it possible to avoid or at least to minimize at least some of the disadvantages of the prior art.

SUMMARY OF THE INVENTION

Proceeding from a valve device of the kind defined in the introduction, it is proposed in accordance with the invention, in order to solve the stated problem, to form the spring element such that its rigidity with respect to pressing forces oriented in the axial direction of the spring element is not constant everywhere, but instead is different, in such a way that the valve element sealing surface, when the valve element is pivoted into its closed position, is adaptable to the valve seat with a minimal application of force, with the valve element nevertheless being protected over a maximum operating time at least against appreciable vibration-like movements.

The present invention also relates to a spring element for a wastegate valve of a turbocharger as has been defined in the introduction for a valve device, and the spring element according to the invention likewise is characterized in that its rigidity with respect to pressing forces oriented in the direction of the spring element axis is not constant everywhere, but instead is different in the manner as defined above.

The valve device according to the invention is advantageously configured such that the spring element is held on the valve element shaft at least substantially non-rotatably relative to the valve element carrier, and such that, when the annular transition region has at least substantially the same height everywhere (measured in the direction of the axis of the spring element opening), this transition region has at least one first longitudinal portion, in which the transition region has its greatest width (compared to longitudinal portions other than the at least one first longitudinal portion). If the spring element is then held in the valve device such that, when the valve element is in its closed position, a first longitudinal portion of the spring element transition region as defined above is opposite (in the longitudinal direction of the shaft of the valve element in its closed position) the region of the valve seat against which the valve element sealing surface is initially placed by means of a first sealing surface region as the valve element approaches its closed position, a minimal application of force is required for the adaptation of the valve element to the valve seat. The above-mentioned first longitudinal portion of the spring element transition region is then also opposite the aforementioned first region of the valve element sealing surface.

Where reference is made above to the fact that (when the valve element is in its closed position) a first longitudinal portion (of greatest width) of the spring element transition region is opposite the first sealing surface region of the valve element sealing surface initially placed against the valve seat, this is not intended to rule out a situation in which the first sealing surface region of the valve element sealing surface is offset relative to the first longitudinal portion of the spring element transition region (transversely to the axis of the valve element shaft).

Preferred embodiments of the valve device according to the invention are consequently characterized in that the pivot angle plane defined by the pivot movement of the valve element extends through a first, above-defined longitudinal portion of the spring element transition region, which in particular is arranged at least substantially symmetrically with respect to said plane.

In principle, the spring element opening does not necessarily have to lie in the center of the annular or plate-shaped spring element; rather, this opening could also be arranged eccentrically, and, instead of a circular form, the opening could also have an elongate form, in particular an oval form, so as to also provide the transition region of the spring element with a width that varies around the opening in the case of a circular outer edge of the spring element.

The spring element is preferably configured such that its transition region has two first longitudinal portions of greatest width, which are opposite one another with respect to the axis of the spring element opening, which is also advantageous with regard to the deformation behavior of the spring element or functionality thereof.

The spring element is in particular configured such that, as considered in the direction of the axis of the spring element opening, the opening has an elongate form with two longitudinal end regions opposite one another with respect to the opening axis, said longitudinal end regions being adjacent to the two first longitudinal portions (greatest width) of the spring element transition region in a radial direction with respect to the spring element opening (apart from the radially inner ring region of the spring element arranged in between).

Due to the usually confined installation conditions of a turbocharger for the spring element, the spring element advantageously has a half bead, the flank of which is formed by the spring element transition region—in a cross-section through the spring element, the half bead has two bead feet, which are connected to one another by what is known as the flank of the bead. It should be noted at this juncture that in a plan view of the annular spring element a half bead requires less space than what is known as a full bead (measured in a radial direction with respect to the axis of the spring element opening).

As already mentioned, the present invention also relates to a spring element for a wastegate valve of a turbocharger, more specifically a spring element of this kind formed substantially in a plate-like manner, as has been defined in the introduction for a valve device that is to be improved by the invention.

As is clear from the details above relating to the valve device according to the invention, a spring element, the transition region of which is formed by a half bead surrounding the spring element opening and comprising a radially outer bead foot transitioning into the radially outer ring region of the spring element, a radially inner bead foot transitioning into the radially inner ring region of the spring element, and a bead flank connecting the two bead feet to one another, is characterized in that, as considered in the direction of the axis of the spring element opening, the width of the spring element transition region around the spring element opening varies such that the transition region has two first longitudinal portions of greatest average width opposite one another with respect to the spring element opening and, between these two first longitudinal portions, on each of the two sides of the spring element opening, a second longitudinal portion of smallest average width, and in that the bead flank in the first longitudinal portions of the transition region is more heavily inclined relative to the axis of the spring element opening than in the second longitudinal portions (with at least substantially constant height of the half bead around the spring element opening).

BRIEF DESCRIPTION OF THE DRAWINGS

Further features, details and advantages of the invention will become clear from the accompanying claims and from the accompanying drawings and/or the following description thereof. In the drawings:

FIG. 4 shows a view of the spindle, of the valve element carrier, and of the valve element as considered in the direction of the arrow A from FIG. 3;

FIG. 5 shows a view of the parts shown in FIG. 4 as considered in the direction of the arrow B from FIG. 4;

DETAILED DESCRIPTION OF THE INVENTION

FIGS. 1 to 6 and 6A are largely identical to FIGS. 1 to 6 and 6A of DE 10 2012 101 322 A1, and consequently features of the present invention are not evident therein. The accompanying FIGS. 1 to 6 and 6A and the following description thereof, however, serve to facilitate the understanding of the present invention.

Figure 1:
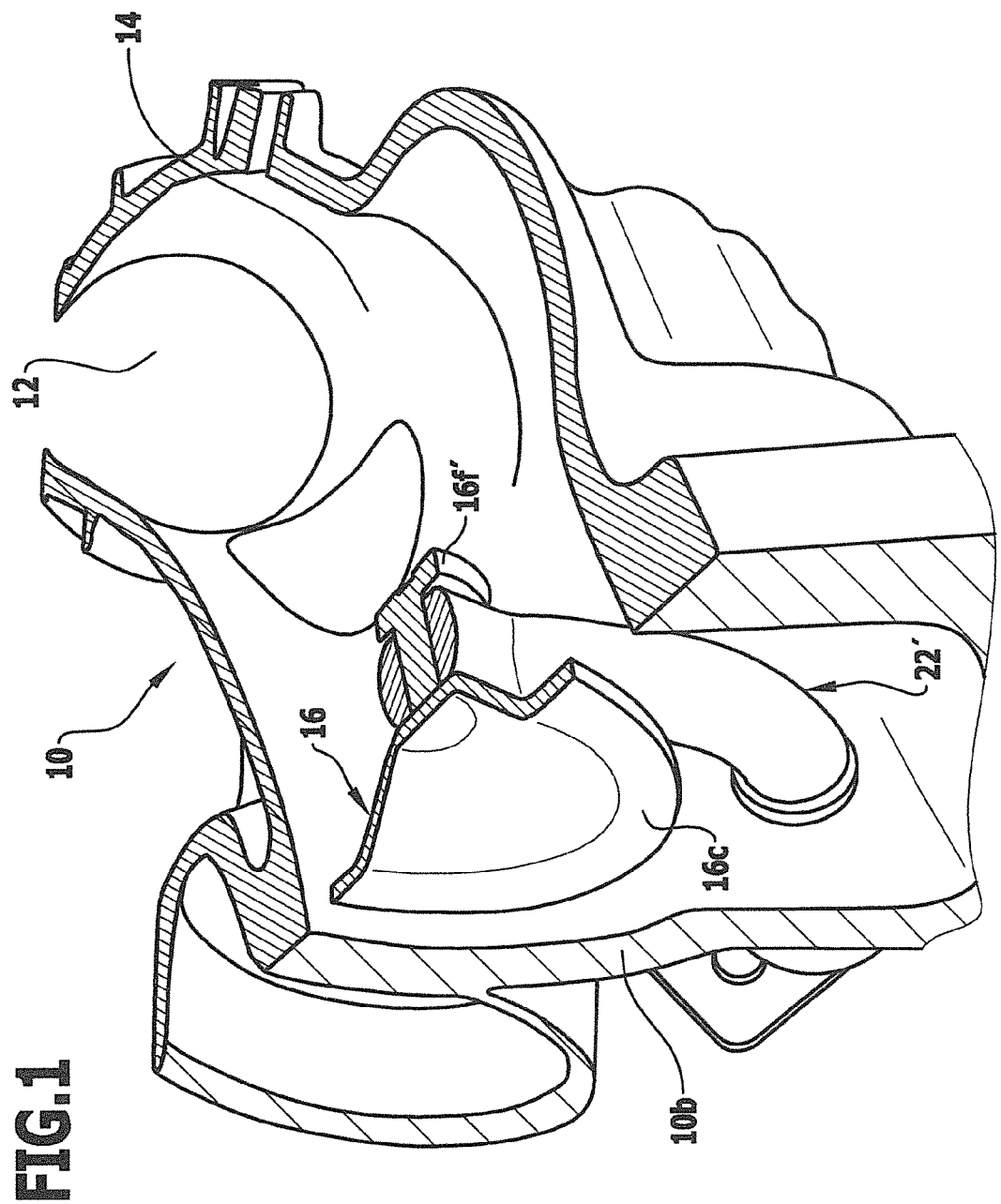
FIG. 1 shows a cut-away part of a turbine housing of a turbocharger with a valve element formed as a wastegate valve, together with valve element carrier, in an isometric illustration.
Figure 2:
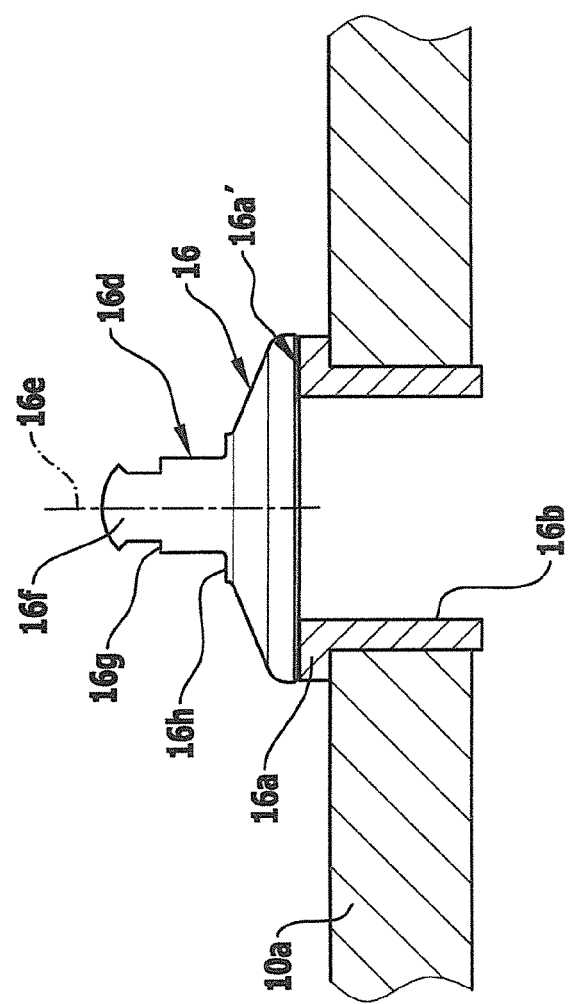
FIG. 2 shows the valve element provided with a shaft in a side view and, in a sectional illustration, shows part of a wall of the turbine housing with a valve seat for the valve element.

FIG. 1 shows a part of a turbine housing 10 into which the exhaust gas flow serving to drive an exhaust gas turbocharger turbine, not shown, enters through an exhaust gas inlet opening 12. Said exhaust gas inlet opening connects with an exhaust gas inflow path 14 formed in the turbine housing 10, which exhaust gas inflow path leads to the turbine, and a valve element 16, in this embodiment configured as a wastegate valve, is arranged in the exhaust gas inflow path. This valve element 16 of plate-like configuration, shown only partly in FIG. 1, can be moved in a manner described below in the exhaust gas inflow path 14 relative to the turbine housing 10, to enable an exhaust gas through-opening, not shown in FIG. 1, which is formed in the wall of the turbine housing 10 to the left of the valve element 16, to be completely closed and in as gastight a manner as possible—for this purpose a wall 10a of the turbine housing 10 shown in FIG. 2 is provided with a valve seat 16a which surrounds the exhaust gas through-opening 16b, also shown in FIG. 2. As will be clear from the following, in the embodiment shown, the valve element 16 is moved in such a way that it is able not only to completely close, but also to open to a greater or lesser extent or completely the exhaust gas through-opening 16b. By means of the valve element 16, a bypass path for the exhaust gas flow, which is formed by a channel, not shown in FIG. 1, formed in the turbine housing 10, can thus be closed or partly or completely opened in order to conduct the exhaust gas flow entering the turbine housing 10 completely, partly or not at all via the exhaust gas turbocharger turbine by the exhaust gas flow being optionally conducted partly or completely out of the exhaust gas inflow path 14 by way of the bypass path. The exhaust-gas through-opening 16b shown in FIG. 2, however, constitutes the start of the bypass path.

From FIGS. 1 and 2 it can be seen that the plate-like valve element 16 has a sealing surface 16c, in this case of circular ring-shaped configuration, which lies in a plane and cooperates with a corresponding sealing surface of the valve seat 16a. Formed on the plate-like valve element 16 is a shaft 16d, the axis of which was designated 16e in FIG. 2, and the free, upper end of which, in accordance with FIG. 2, is provided with a thickened head 16f. Between this head and the plate-like valve element 16, the shaft 16d has an, in accordance with FIG. 2, upper annular shoulder 16g, and an, in accordance with FIG. 2, lower annular shoulder 16h is provided at the transition from the shaft to the valve element 16, An assembly comprising the valve element, the parts carrying the valve element, and the parts moving the valve element between an open position and a closed position will be described below with reference to FIGS. 3 to 6 and 6A.

Belonging to this assembly is a shaft-like spindle 20, on which is formed a valve element carrier 22, which extends in the manner of an arm transversely away from the spindle 20 comprising an axis 20a, and over the major part of its length has a substantially rectangular cross-section and, therefore, two flat sides. In the proximity of its free end, the valve element carrier 22 has a hole, in particular a circular hole, through which the shaft 16d passes, so that the annular shoulder 16h provided at the transition from this shaft to the valve element 16 can be supported on the side 22b of the valve element carrier 22.

Arranged between the head 16f of the shaft 16d and the valve element carrier 22 is a washer 24, which has two end faces 24a and 24b, preferably on the whole flat and parallel to each other, one of which is supported on the annular shoulder 16g of the shaft 16d. The spacing of the two annular shoulders 16g and 16h from each other, the thickness of the region of the valve element carrier 22 provided with the hole 22c and the thickness of the washer 24 are matched so as to obtain in between the washer 24 positioned by the head 16f against the annular shoulder 16g and the valve element carrier 22 abutting against the annular shoulder 16h an annular gap in which is arranged an annular spring element 30, through which the shaft 16d passes.

In the shown embodiment the shaft 16d provided on the valve element 16 is first passed through the hole 22c of the valve element carrier 22, wherein the spring element 30 and the likewise annular washer 24 are pushed onto the shaft 16d, and the washer is positioned against the annular shoulder 16g. The free end of the shaft 16d, which at first does not yet have the head 16f, is then deformed by a kind of riveting procedure so as to produce the thickened head 16f, during formation of which the washer 24 is pressed against the annular shoulder 16g, and by means of which the valve element 16 is secured on the valve element carrier 22, and the spring element 30 and the washer 24 are held on the shaft 16d.

Figure 6:
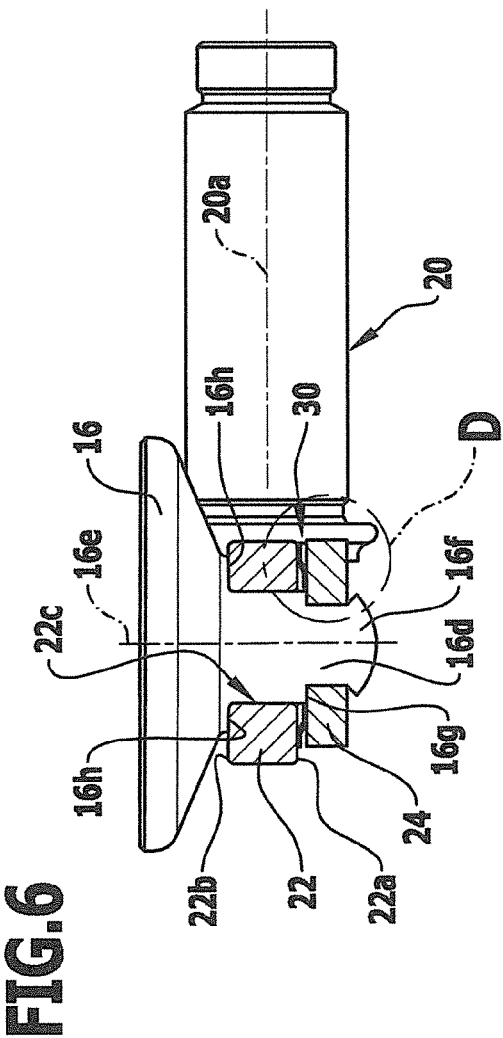
FIG. 6 a view of the parts shown in FIG. 4 as considered in the direction of the arrow C from FIG. 4, wherein however a region of the valve element carrier and a washer have been shown in section.

As is clear from FIG. 6, the spring element 30 abuts with its two sides against flat surfaces extending perpendicularly to the axis 16e, which are formed by a side 22a of the valve element carrier 22 and an end face 24b of the washer 24. The configuration and function of the spring element 30 will be described below.

Figure 3:
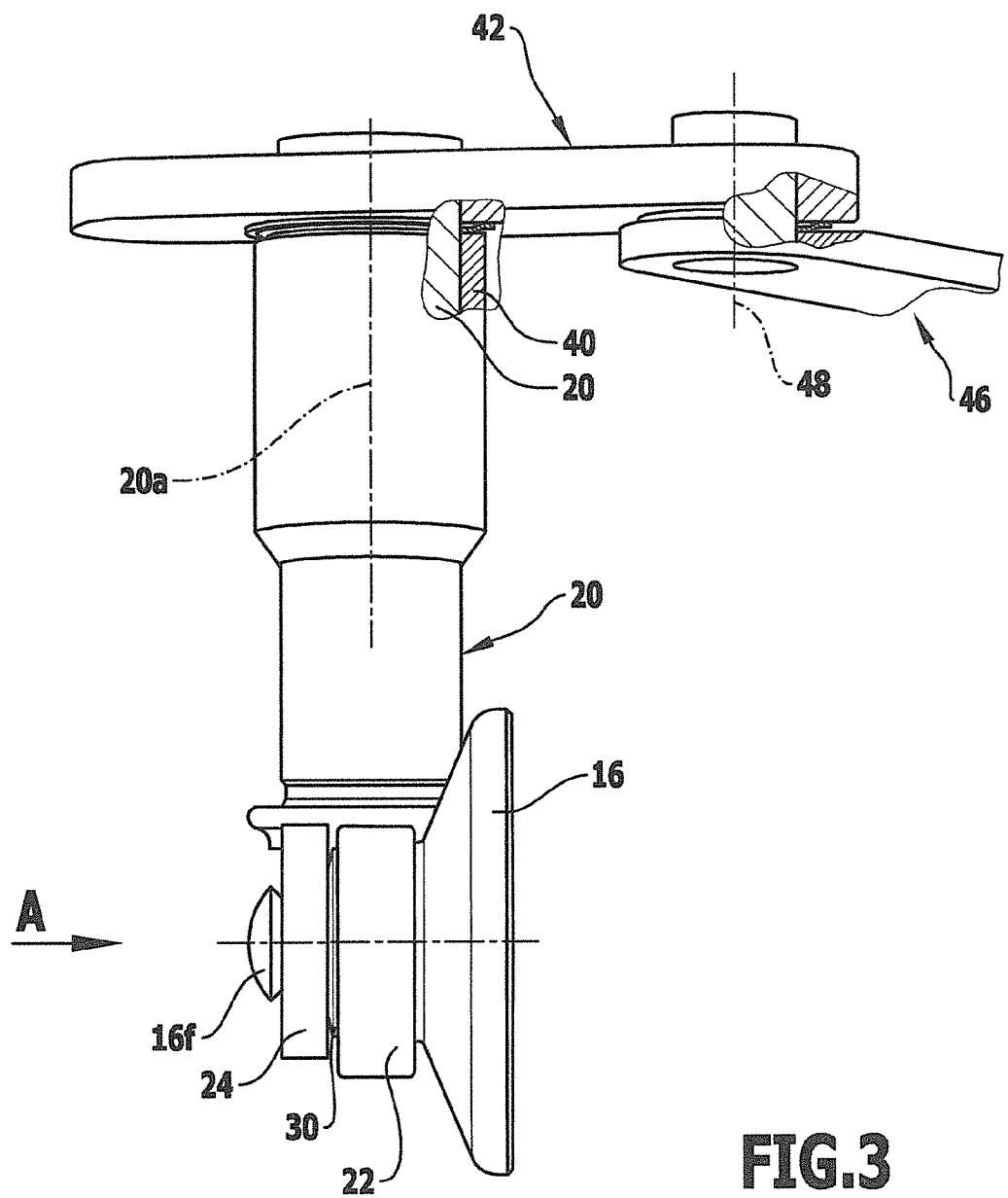
FIG. 3 shows a partially broken-open side view of an assembly, consisting of the valve element, the valve element carrier, a spindle held rotatably in a bearing bush and provided with the valve element carrier, an adjusting lever secured to said spindle, and an adjusting lever actuating element connected in an articulated manner to said adjusting lever.

As shown in FIG. 3, the spindle 20 is held by a bearing bush 40 and is mounted therein so as to be rotatable about the spindle axis 20. The bearing bush 40 is secured in a wall 10b, visible in FIG. 1, of the turbine housing 10, however, it is also possible for the spindle 20 to be arranged directly in a correspondingly shaped opening of the wall 10b and to be mounted rotatably about the spindle axis 20a.

Regarding FIG. 1, it must also be pointed out that it shows an embodiment of the valve element carrier, which is modified in comparison with FIG. 4 and was designated 22' in FIG. 1; furthermore, FIG. 1 shows an alternative configuration of the free end of the shaft 16d of the valve element 16, for which reason this free shaft end forming an abutment was designated 16f' in FIG. 1—in contrast to that shown in FIG. 1, this abutment is formed in practice by a disc which is fixedly connected to the actual shaft, for example by welding. Finally, mention is made of the fact that FIG. 1 shows another arrangement of the valve element 16 on the valve element carrier 22'.

The, in accordance with FIG. 3, upper end of the spindle 20 passes through a hole, not visible in FIG. 3, of an adjusting lever 42 and is connected to the latter at least non-rotatably, but preferably also so as not to be displaceable in the direction of the spindle axis 20a. The person skilled in the art is familiar with the means required for this, which, therefore, need not be explained.

An adjusting lever actuating element 46 engages the adjusting lever 42, which is rotatable together with the spindle 20 about the spindle axis 20a, and in the embodiment shown in FIG. 3 the adjusting lever actuating element is in the form of an arm or lever, but it could also have a different shape, as it need only fulfil the function of being able to pivot the adjusting lever 42 about the spindle axis 20. The adjusting lever actuating element 46 is articulated on the adjusting lever 42 in such a way that it can be pivoted relative to the adjusting lever 42 at least about a pivot axis 48 extending parallel to the axis 20a of the spindle 20.

Figure 6A:
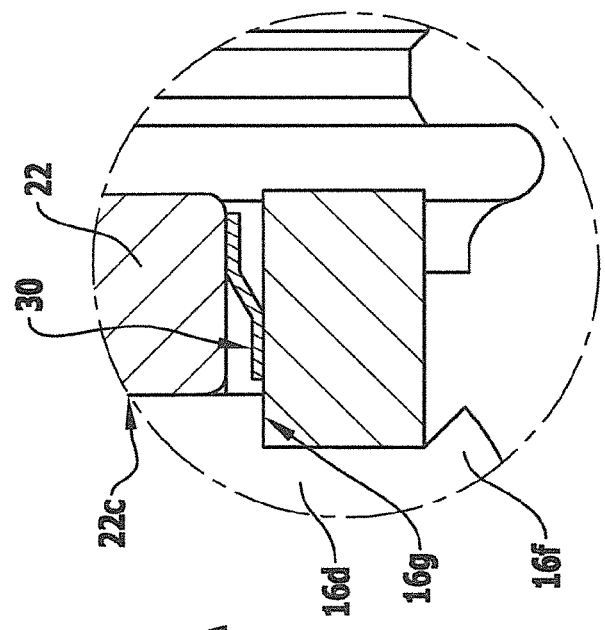
FIG. 6A the detail D from FIG. 6 on a larger scale.

FIG. 2 shows the valve element 16 in its closed position, in which it bears with its circular ring-shaped sealing surface 16c (see in particular FIG. 1) against the likewise circular ring-shaped sealing surface 16a' (see FIG. 2) of the valve seat 16a. As can be seen from FIG. 5, The valve element 16 is pivoted by rotating the spindle 20 about the spindle axis 20a, and, on the assumption that FIG. 5 shows the valve element 16 in its open position, it is pivoted, by rotation of the spindle 20, from its open position into its closed in accordance with the arrows S shown in FIG. 5, more specifically is pivoted through a pivot angle range, the range limits of which are defined by the open position and the closed position of the valve element, said pivot angle range defining a pivot angle plane, which extends perpendicularly to the spindle axis 20a and to the plane of the valve element sealing surface 16c, is coincident with the drawing plane of FIG. 5, and in which the longitudinal axis 16e of the valve element shaft 16d lies when the annular spring elements produced from a sheet metal and shown in FIGS. 6 and 6A has the same height everywhere around its opening, through which the valve element shaft 16d extends, prior to installation (and also for the installed state as shown in FIGS. 6 and 6A), the valve element 16 bears with its annular shoulder 16h around and against the flat side 22b of the valve element carrier 22, and the flat end face of the washer 24 facing towards the valve element carrier 22 and also the two flat sides 22a and 22b of the valve element carrier run parallel to one another—this means, in other words, that when the valve element 16 is in its open position the two contact faces of the spring element 30, by means of which said spring element bears against the two adjacent abutment faces for the spring element, lie in planes parallel to one another, as is the case in preferred embodiments of the spring element according to the invention, which is yet to be discussed.

A preferred embodiment of the spring element according to the invention will be described hereinafter with reference to FIGS. 7 and 8.

The spring element 60 was produced preferably by a stamping and embossing process from a sheet metal, the material of which, even at the highest temperatures of the exhaust gases flowing into the turbocharger, at least still has spring-elastic properties sufficient for the function of the spring element. As can be seen from FIG. 7, the spring element 60 has a circular outer edge, however it can also have another suitable shape, in particular the shape of an oval or a polygon. Furthermore, the spring element 60 is provided with a spring element opening 62 and consequently has an annular configuration. The spring element opening 62 preferably has an elongate, in particular oval shape, and the center of the spring element opening 62 preferably lies in the center of the spring element 60; the spring element opening, however, could also be a circular opening. The smallest diameter of the spring element opening should be dimensioned such that it is only very slightly greater than the diameter of the valve element shaft 16d in the shaft region lying in the spring element opening when the spring element is in the assembled state; if this shaft region has a cross-section different from a circular cross-section, the smallest diameter of the spring element opening has to be adapted to the diameter region of the valve element shaft with which the valve element shaft comes closest to the edge of the spring element opening in the region of its smallest diameter.

Figure 7:
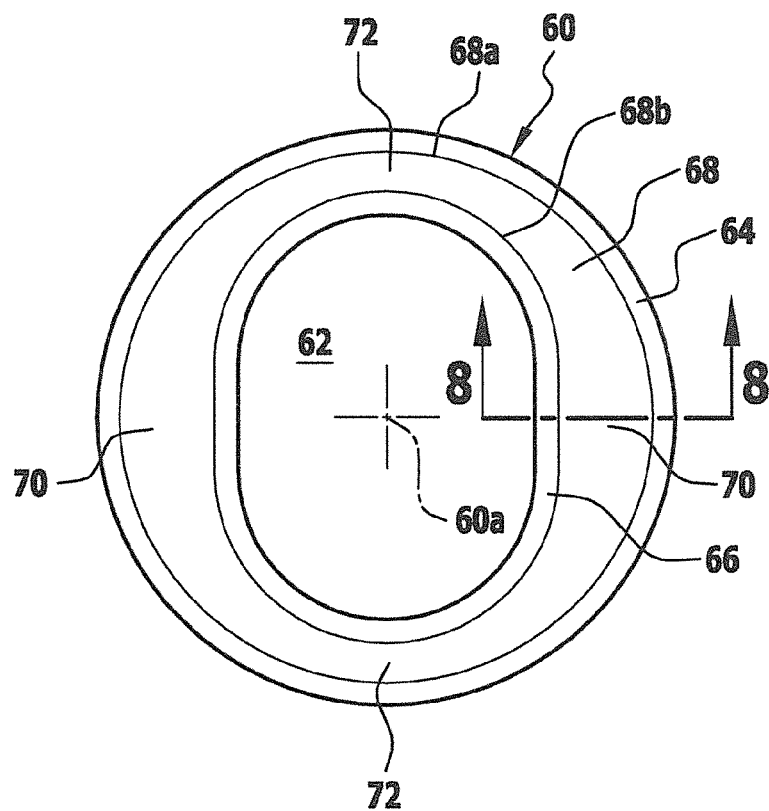
FIG. 7 a plan view of a preferred embodiment of a spring element according to the invention.
Figure 8:
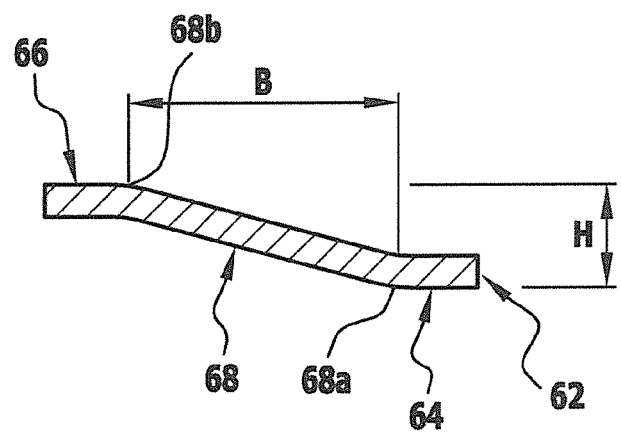
FIG. 8 a section through this spring element along line 8-8 in FIG. 7.

In the plan view of the spring element 60 shown in FIG. 7, said spring element has a radially outer ring region 64, a radially inner ring region 66, and between these ring regions an annular transition region 68, wherein, as can be seen from FIG. 8, the two ring regions 64 and 66 lie in planes that are parallel to one another and are perpendicular to the spring element axis 60a when the spring element it is not yet in the installed state, that is to say is not yet exposed to any pressing forces (in the direction of the spring element axis 60*a*).

As can be seen from FIG. 8, the transition region 68 is formed by a half bead, which transitions by a radially outer bead foot 68*a* into the radially outer ring region 64 and by a radially inner bead foot 68*b* into the radially inner ring region 66. In FIG. 8 the height of this half bead, measured in the direction of the spring element axis 60*a*, has been denoted by H, whereas the width of the transition region 68 has been denoted by B.

Regardless of its cross-sectional shape, the transition region of the spring element must be configured in any case such that the radially outer and the radially inner ring region of the spring element can approach one another spring-elastically (in the direction of the spring element axis) when the spring element is installed or is subjected to axial pressing forces.

The rigidity of a full bead or half bead, apart from being determined by the material properties and the sheet metal thickness, is also determined by the ratio of bead width to bead height: if the bead height is the same everywhere, the rigidity of the bead is all the smaller, the greater is the bead width. In accordance with the invention the transition region of the spring element does not now have a constant width around the spring element opening; rather, the radial width of the transition region and therefore the rigidity thereof varies around the spring element opening, such that the transition region has at least one first longitudinal portion, in which the transition region has its greatest width, in particular its greatest average width. In the case of the spring element 60 as shown in FIGS. 7 and 8, the transition region 68 has two first longitudinal portions 70 of greatest average width of this kind, which are opposite one another in a plan view of the spring element with respect to the spring element axis 60*a* (in the horizontal direction according to FIG. 7), and two second longitudinal portions 72 of smallest average width between these first longitudinal portions 70. The spring element 60 is thus preferably configured such that, with respect to a horizontal diameter line of the spring element according to FIG. 7 or the line 8-8 in FIG. 7 and the spring element axis 60*a*, each of the longitudinal portions 70 extends over an angle of approximately 90°, the angle bisector thereof being formed by the horizontal diameter line, and such that each of the second longitudinal portions 72 extends likewise over an angle of approximately 90°, the angle bisector thereof being formed by a vertical line extending through the spring element axis 60*a* in accordance with FIG. 7.

In the regions of the first longitudinal portions 70, the spring element 60 is thus more pliant than in the second longitudinal portions 72, that is to say has a lower rigidity with respect to pressing forces perpendicular to the drawing plane of FIG. 7, because the transition region 68, that is to say the flank of the half bead, is more heavily inclined relative to the spring element axis 60*a* in the first longitudinal portions 70 than in the second longitudinal portions 72; here, the inclination is to be understood in each case to mean the average value of the angle of inclination of the longitudinal portion in question, since the width of the transition region along each of these longitudinal portions is not constant, but instead decreases or increases continuously (see FIG. 7). The angle of inclination of the transition region 68 is also understood to mean the acute angle forming the transition region 68 (at the considered point of the transition region) with the spring element axis 60*a*, more specifically in a cross-section through the spring element.

Preferred embodiments of the spring element according to the invention are characterized by at least one of the following dimension ratios:

the ratio of the greatest bead width to the smallest bead width is approximately 1.5 to 2.5, and preferably approximately 2;

the ratio of the average bead width to average bead diameter is 0.1 to 0.2, preferably approximately 0.15;

the ratio of bead height to average bead width is 0.3 to 0.5 and preferably approximately 0.4;

in the case of a spring element with an elongate spring element opening, the ratio of the smallest opening diameter to the greatest opening diameter is 0.5 to 1.0, in particular 0.6 to 0.9, and preferably 0.7 to 0.8.

The radial width of the radially outer and radially inner ring region, measured in a plan view of the spring element, can be approximately constant around the spring element opening, but can also vary, since these widths are dependent only on the installation space available for the spring element in a valve device according to the invention and on the dimensions of the valve element shaft. In the case of a spring element according to the invention, however, the radially outer and the radially inner ring regions 64 and 66 respectively preferably have an at least substantially constant width, wherein the width of the radially outer ring region is approximately the same as the width of the radially inner ring region, and wherein the ratio of this width to the outer diameter of the spring element 60 is then preferably 0.03 to 0.05 and in particular approximately 0.04.

Sheet metals made of the following alloys are particularly recommended for production of a spring element according to the invention:

nickel-based alloys and molybdenum-based alloys;

gamma'-phase-hardened metal, resistant to high temperatures, preferably

NiCo20Cr20MoTi (material no. 2.4650), alloy DIN 17744/17750 according to DIN 59746/DIN EN ISO 9445;

alloy 625 (material no. 2.4856), DIN EN 10095;

alloy 263 (material no. 2.4650);

Waspaloy (material no. 2.4654);

NiCr19Fe19Nb5Mo3 (material no 2.4668) according to DIN 59746/DIN EN ISO 9445.

Generally, a metal which at the application temperatures maintains a creep rupture strength of at least 4 to 7% of the starting value at room temperature is recommended as material.

The significant parts of a preferred embodiment of the valve device according to the invention containing the spring element 60 shown in FIGS. 7 and 8 are explained hereinafter with reference to FIGS. 9 and 10. Apart from the reference sign for the spring element 60 and elements thereof, the same reference signs as used in FIGS. 1 to 6 and 6A have been used in FIGS. 9 and 10 wherever possible, but increased by the number 100, because in the embodiment shown in FIGS. 9 and 10 the spindle and the valve element carrier for example are configured slightly differently compared to the valve device shown in FIGS. 1 to 6 and 6A.

Figure 9:
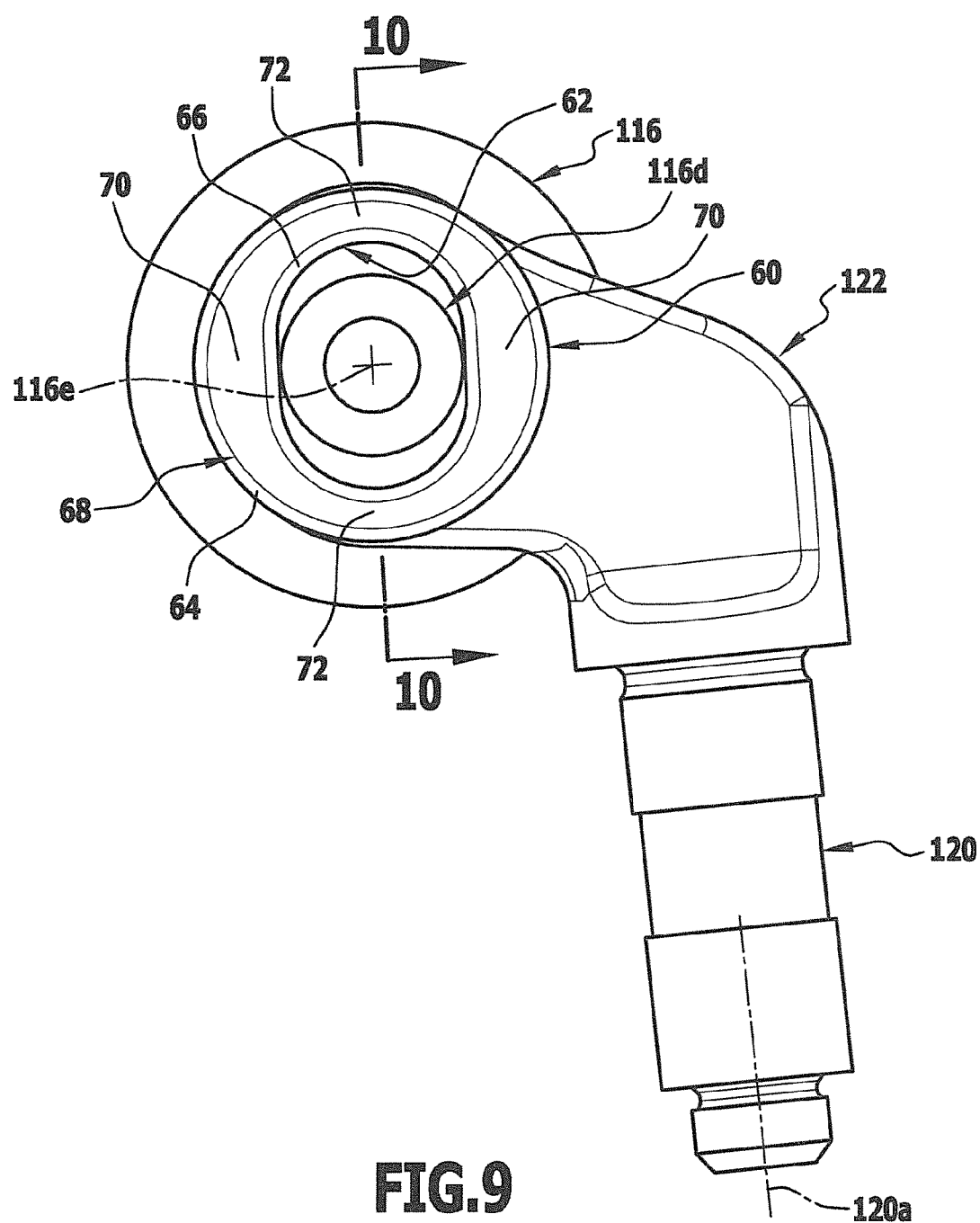
FIG. 9 a view, similar to FIG. 4, of an assembly of a preferred embodiment of the valve device according to the invention, wherein this assembly comprises the spindle, the valve element carrier, and the spring element according to the invention shown in FIG. 7.

FIG. 9 shows, in a side view, a spindle 120, corresponding to the spindle 20 although configured slightly differently, which spindle 120 is intended to be mounted rotatably about its longitudinal axis 120*a* in the turbine housing (not shown); a valve element carrier 122, likewise configured slightly differently, is secured to the spindle 120 and extends away from the spindle 120 or the spindle axis 120*a* in the nature of an arm and, similarly, carries a valve element 116, as is the case in the known valve device, shown in FIGS. 1 to 6, with regard to the valve element 16 and the spindle 20.

FIG. 9 shows a plan view of the valve element 116, more specifically of the rear side facing away from the sealing surface thereof and therefore a valve element shaft 116d is visible in FIG. 9, which valve element shaft extends through the spring element opening 62 of the spring element 60.

FIG. 9 shows the valve element shaft 116d before the free end thereof has been provided with an abutment corresponding to the head 16f.

Figure 10:
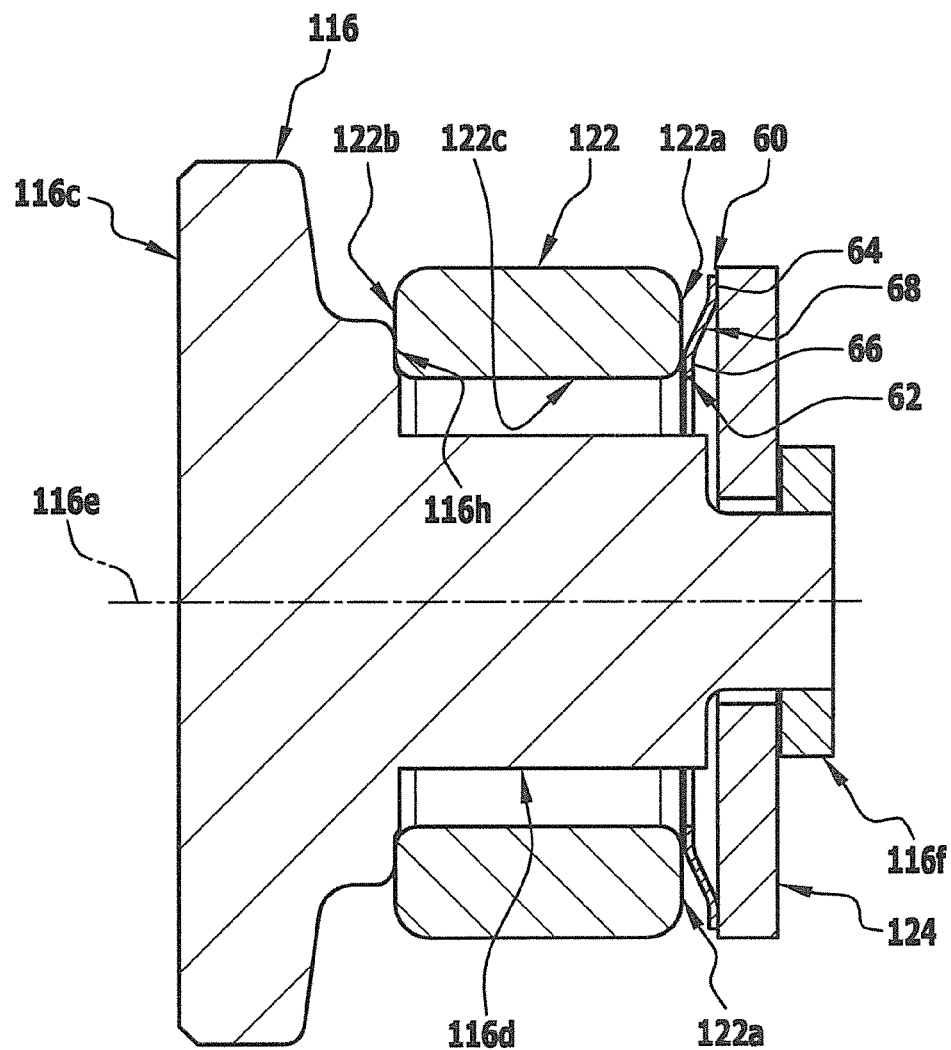
FIG. 10 shows a section along the line 10-10 in FIG. 9.

According to FIG. 10, the valve element shaft 116d extends through an opening 122c in the valve element carrier 122, which opening can have a circular cross-section, similarly to the valve element shaft; play of the valve element shaft in the opening of the valve element carrier (in a direction transverse to the shaft axis) then allows and defines the maximum angle about which the valve element can tilt relative to the valve element carrier. The valve element carrier 122 shown in FIG. 10 in fact has an opening 122c, the diameter of which is much greater than the outer diameter of the region of the valve element shaft 116d disposed in this opening, however the opening of the valve element carrier can also be adapted to this shaft diameter in order to hold the shaft of the valve element centrally with play in the opening of the valve element carrier.

The valve element 116 bears with an annular face of its annular shoulder 116h against a flat side 122b of the valve element carrier 122, which, similarly to the annular face of the annular shoulder 116h, runs preferably in a plane perpendicular to the shaft axis 116e. The spring element 60 bears with its radially inner annular region 66 against a flat side 122a of the valve element carrier 122 and with its radially outer annular region 64 against a flat side of a disc 124, wherein these two flat sides also lie in planes perpendicular to the shaft axis 116e. With a tapered free end region, the valve element shaft 116d extends through a central opening in the disc 124, for which purpose the free end region of the valve element shaft 116d (after assembly of the aforementioned parts) is provided with an abutment 116f, which is shaped similarly to a ring disc, is firmly attached to the valve element shaft 116d and corresponds in its function to the head 16f of the known valve device shown in FIGS. 1 to 6.

The above-described parts should be dimensioned and the abutment 116s should be positioned such that the spring element 60 is clamped between the valve element carrier 122 and the disc 124 under a certain prestress (in the direction of the shaft axis 116e).

It is also worth mentioning that the spring element 60 can be provided along the edge of its opening 62 with a plurality of protrusions protruding inwardly in the radial direction and spaced from one another in the peripheral direction of the spring element opening, said protrusions bearing against the outer periphery of the valve element shaft 116d and thus centering the spring element on the valve element 116; additionally or alternatively the spring element 60 can also be provided at its outer periphery with protrusions spaced from one another in the peripheral direction, which protrusions are bent in the axial direction such that they bear against the outer periphery of the disc 124 so as to thus center the spring element 60 on the disc 124 and/or so as to thus center the disc 124 relative to the shaft axis 116e.

If, in the valve device shown in FIGS. 9 and 10, the spindle 120 rotates about its longitudinal axis 120a and the valve element 116 cooperating with the valve seat 16a shown in FIG. 2 is thus moved from its open position into its closed position, the valve element 116 performs a pivoting movement about the spindle axis 120a and in so doing is firstly placed with a first sealing surface region of its sealing surface 116a against the sealing surface 16a' of the valve seat 16a (see FIG. 2), because the valve element 116 performs a pivoting movement and its sealing surface 116c also does not run parallel to the sealing surface 16a' just before contact is made against the sealing surface 16a' of the valve seat 16a; in addition, manufacturing tolerances and different thermal expansions of the components of the valve device according to the invention occurring during operation of the turbocharger already have the result that the sealing surface 116c of the valve element 116 also can be tilted, even if only slightly, relative to the sealing surface 16a' of the valve seat 16a just before its closed position.

As can be seen from FIG. 9, the region of the valve element sealing surface 116c that is placed against the sealing surface 16a' of the valve seat 16a just before the closed position of the valve element lies behind the first longitudinal portion 70 of the half bead or of the transition region 68 of the spring element 60, shown on the right in accordance with FIG. 9 and as considered in a direction perpendicular to the longitudinal axis 116e of the valve shaft 116d, even if slightly offset radially outwardly with respect to the axis 116e. Consequently, specifically due to the lower rigidity of the bead longitudinal portion 70, a lesser force is required in order to adapt the valve element sealing surface 116c to the sealing surface 16a' of the valve seat 16a before the valve element is pressed at least substantially in a gastight manner against the valve seat 16a.

This advantage, however, of the spring element according to the invention presupposes that said spring element is held on the valve element shaft at least substantially non-rotatably relative to the valve element carrier, in order to at least substantially secure the angular position of the longitudinal portion 70 (where reference is made above the fact that the spring element is held on the valve element shaft, this is to be understood to mean merely that the spring element is held such that the valve element shaft extends through the spring element, but not necessarily that the valve element shaft must be responsible for securing the spring element against rotation).

In order to prevent the spring element 60 from rotating relative to the valve element carrier 122, a wide range of means are available to the person skilled in the art: A point of the radially inner ring region 66 of the spring element could be connected in particular by spot welding to the valve element carrier 122, a point of the radially inner ring region 66 could be provided by embossing with a nub-like or rib-like protrusion, which engages in a corresponding indentation in the flat side 122a of the valve element carrier 122, and/or the valve device according to the invention can be configured as is shown in FIG. 11 and is described hereinafter.

Figure 11:
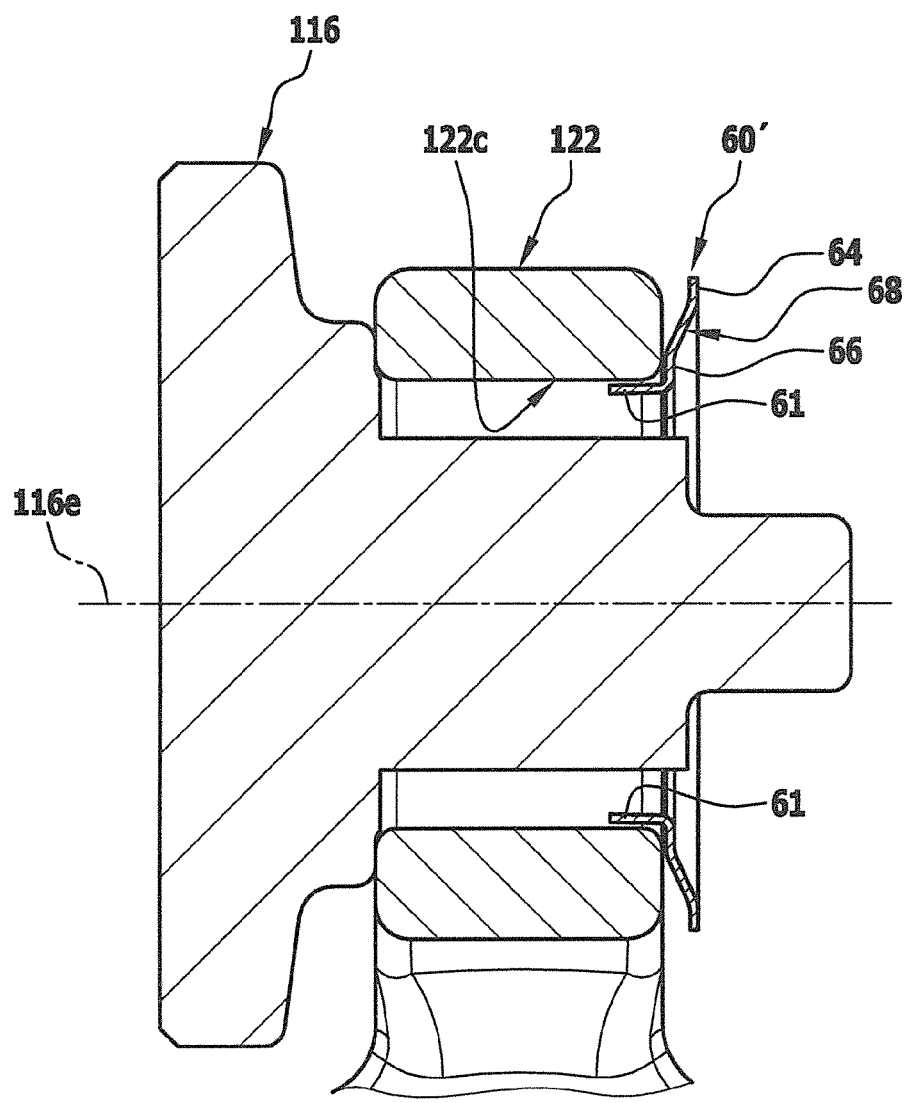
FIG. 11 shows a sectional illustration, corresponding to FIG. 10, through a second embodiment of the assembly of the valve device according to the invention, wherein FIG. 11 also shows a further, particularly advantageous embodiment of the spring element according to the invention, and a region of the valve element carrier not shown in FIG. 10 is visible.

FIG. 11 is substantially identical to FIG. 10, apart from the following differences, and therefore only these differences need to be described:

The spring element 60' according to the invention shown in FIG. 11 differs from the spring element 60 shown in FIGS. 7 to 10 by a plurality of sheet-metal tongues 61 spaced from one another in the peripheral direction of the spring element and bent in the axial direction, and the opening 122c of the valve element carrier 122 does not have a circular cross-section, at least not in its axial end region adjacent to the spring element 60'.

At least in this end region, the opening 122c has an elongate cross-sectional shape, in particular an oval cross-sectional shape, and the spring element 60' is provided with at least two sheet-metal tongues 61, which are opposite one another with respect to the spring element axis and which are arranged in the peripheral direction of the spring element such that they engage in the opening 122c of the valve element carrier 122 at opposite points of the opening, at which at least this opening region has its greatest diameter. As can be seen from a comparison of FIG. 11 and FIG. 9, these two sheet-metal tongues 61 are then disposed in peripheral angular positions of the spring element 60', with respect to the spring element axis 60a (see FIG. 7), in which the second longitudinal portions 72 of the transition region 68 are also disposed, such that the correct position of the first longitudinal portion 70 of the spring element (on the right in accordance with FIG. 9) is secured by the sheet-metal tongues 61.

As can be seen from FIG. 11, however, alternative possibilities are also available for securing the spring element 60' against rotation: The two sheet-metal tongues 61 could be slightly offset radially outwardly relative to the embodiment shown in FIG. 11 and the wall of the opening 122c of the valve element carrier 122 could be provided with indentations adapted to the form of the sheet-metal tongues 61, with said sheet-metal tongues engaging in said indentations when the spring element 60' is fitted onto the valve element carrier 122; each of the sheet-metal tongues 61 could also be provided by embossing with a radially outwardly oriented protrusion, which in particular is nub-shaped or rib-shaped, and the wall of the opening 122c of the valve element carrier 122 could be provided with accordingly shaped and arranged indentations, in which these protrusions engage (in the case of a nub-like or similar configuration of these protrusions, this could also be used to secure the spring element 60' to the valve element carrier 122 in the axial direction).

It should also be mentioned that in FIG. 11 the disc 124 shown in FIG. 10 and the abutment 116f shown there have been omitted for the sake of simplicity.

The invention claimed is:

1. A valve device for an exhaust-gas bypass path of a turbocharger, said valve device having:
   a plate-like valve element, which has a sealing surface lying in a plane and a shaft extending away from the sealing surface and is movable between a closed position and an open position;
   a valve element carrier, to which the valve element is connected by means of its shaft so that the valve element is movable to a limited extent relative to the valve element carrier in a direction perpendicular to the valve element sealing surface;
   a spindle, which is held so as to be rotatable about a spindle longitudinal axis and is fixedly connected to the valve element carrier, such that the valve element is movable between its closed position and its open position by rotation of the spindle;
   a valve seat surrounding an exhaust-gas through-opening, against which valve seat the valve element sealing surface bears with a sealing pressure in an at least substantially gastight manner in the closed position of the valve element; and
   a substantially annular spring element produced from a sheet metal and having an opening through which the valve element shaft extends,
   wherein by means of the valve element carrier, the valve element is held in such a way that, as considered in the direction of the spindle longitudinal axis, by rotating the spindle the plane defined by the valve element sealing surface is pivotable about the spindle longitudinal axis through a pivot angle range, the range limits of which are defined by the closed position and the open position of the valve element and which defines a pivot angle plane extending perpendicularly to the spindle longitudinal axis and to the plane of the valve element sealing surface, in which pivot angle plane the longitudinal axis of the valve element shaft lies;
   wherein with respect to the axis of its opening and as considered in the direction of this axis, the spring element has a radially outer ring region, a radially inner ring region adjoining the spring element opening, and therebetween an annular transition region, such that the radially outer ring region is offset relative to the radially inner ring region in the direction of the axis of the spring element opening such that play in the direction of the longitudinal axis of the valve element shaft between the valve element and the valve element carrier is at least mostly eliminated by the spring element,
   wherein the radially inner and the radially outer ring region are at least substantially flat and lie in planes perpendicular to the axis of the spring element opening,
   wherein, as considered in the direction of the axis of the spring element opening, the radially inner ring region has an elongate non-elliptical shape defined by two curved convex ends connected by two substantially straight and parallel sides, and
   wherein the spring element is held on the valve element shaft substantially non-rotatably relative to the valve element carrier, and, with respect to the axis of the spring element opening and as considered in the axial direction, the radial width of the spring element transition region and thus the rigidity of the transition region with respect to pressing forces oriented in the direction of the axis of the spring element opening varies around the spring element opening, and wherein the transition region has two first longitudinal portions, in which the transition region has its greatest width and which are traversed by the pivot angle plane and are arranged opposite one another with respect to the spring element opening.

2. The valve device according to claim 1, wherein each first longitudinal portion is arranged at least substantially symmetrically with respect to the pivot angle plane.

3. The valve device according to claim 2, wherein said substantially straight and parallel sides are arranged opposite one another with respect to the opening axis, and in a circumferential direction of the spring element opening between said substantially straight and parallel sides, the two first longitudinal portions of the spring element transition region are arranged.

4. The valve device according to claim 1, wherein the spring element has a half bead, the flank of which is formed by the spring element transition region.

5. The valve device according to claim 4, wherein the flank of the half bead in the at least one first longitudinal portion of the spring element transition region is more heavily inclined relative to the axis of the spring element opening than in the other longitudinal portions of the spring element transition region.

6. The valve device according to claim 1, wherein, as considered in a direction perpendicular to the valve element sealing surface, the valve element and the spring element have a circular outer edge, the radially outer spring element ring region has the form of a circular ring, the spring element opening has an oval form and the radially inner spring element ring region adjoining the spring element opening has the same width everywhere.

7. A spring element for a wastegate valve of a turbocharger, which is substantially plate-like and is produced from a sheet metal and is provided with a central opening,
wherein, with respect to the axis of its opening and as considered in the direction of this axis, the spring element has a radially outer ring region with a circular outer edge, a radially inner ring region adjoining the spring element opening, and therebetween an annular transition region, such that the radially outer ring region is offset relative to the radially inner ring region in the direction of the axis of the spring element opening,
wherein the radially inner and the radially outer ring region are at least substantially flat and lie in planes perpendicular to the axis of the spring element opening,
wherein, as considered in the direction of the axis of the spring element opening, the radially inner ring region has an elongate non-elliptical shape defined by two curved convex ends connected by two substantially straight and parallel sides,
wherein the transition region is formed by a half bead surrounding the spring element opening and having a radially outer bead foot transitioning into the radially outer ring region, a radially inner bead foot transitioning into the radially inner ring region, and a bead flank connecting the two bead feet to one another,
wherein, as considered in the direction of the axis of the spring element opening, the width of the spring element transition region varies around the spring element opening such that the transition region has two first longitudinal portions of greatest average width arranged opposite one another with respect to the spring element opening, and between these two first longitudinal portions has two second longitudinal portions of smallest average width likewise arranged opposite one another with respect to the spring element opening, and
wherein the bead flank in the first longitudinal portions of the transition region is more heavily inclined relative to the axis of the spring element opening than in the second longitudinal portions.

8. The spring element according to claim 7, wherein, in each cross-section through the spring element containing the axis of the spring element opening, the bead flank is inclined relative to the axis of the spring element opening in such a way that the radially outer bead foot has a greater spacing from the opening axis than the radially inner bead foot.

9. The spring element according to claim 7, wherein, said substantially straight and parallel sides are arranged opposite one another with respect to the opening axis, and in a circumferential direction of the spring element opening between said substantially straight and parallel sides, the two first longitudinal portions of the spring element transition region are arranged.

10. The spring element according to claim 7, wherein, as considered in a direction perpendicular to the valve element sealing surface, the spring element has a circular outer edge, the radially outer spring element ring region has the form of a circular ring, the spring element opening has an oval form and the radially inner spring element ring region adjoining the spring element opening has the same width everywhere.

11. A turbocharger wastegate valve comprising:
a spring element which is substantially plate-like and is produced from a sheet metal and is provided with a central opening,
wherein, with respect to the axis of its opening and as considered in the direction of this axis, the spring element has a radially outer ring region with a circular outer edge, a radially inner ring region adjoining the spring element opening, and therebetween an annular transition region, such that the radially outer ring region is offset relative to the radially inner ring region in the direction of the axis of the spring element opening,
wherein the radially inner and the radially outer ring region are at least substantially flat and lie in planes perpendicular to the axis of the spring element opening,
wherein, as considered in the direction of the axis of the spring element opening, the radially inner ring region has an elongate non-elliptical shape defined by two curved convex ends connected by two substantially straight and parallel sides,
wherein the transition region is formed by a half bead surrounding the spring element opening and having a radially outer bead foot transitioning into the radially outer ring region, a radially inner bead foot transitioning into the radially inner ring region, and a bead flank connecting the two bead feet to one another,
wherein, as considered in the direction of the axis of the spring element opening, the width of the spring element transition region varies around the spring element opening such that the transition region has two first longitudinal portions of greatest average width arranged opposite one another with respect to the spring element opening, and between these two first longitudinal portions has two second longitudinal portions of smallest average width likewise arranged opposite one another with respect to the spring element opening, and
wherein the bead flank in the first longitudinal portions of the transition region is more heavily inclined relative to the axis of the spring element opening than in the second longitudinal portions,
said wastegate valve further comprising a plate-like valve element and a valve element carrier, said valve element having a sealing surface lying in a plane and a shaft extending away from the sealing surface and through the central opening of the spring element,
said spring element being connected to the valve element carrier by means of said shaft but being movable to a limited extent relative to the valve element carrier in a direction transversely to the valve element sealing surface, and the spring element being held on said shaft at least substantially non-rotatably relative to the valve element carrier.

12. The turbocharger wastegate valve according to claim 11, wherein, in each cross-section through the spring element containing the axis of the spring element opening, the bead flank is inclined relative to the axis of the spring element opening in such a way that the radially outer bead foot has a greater spacing from the opening axis than the radially inner bead foot.

13. The turbocharger wastegate valve according to claim 11, wherein said substantially straight and parallel sides are arranged opposite one another with respect to the opening axis and between which, in a circumferential direction of the spring element opening, the two first longitudinal portions of the spring element transition region are arranged.

14. The turbocharger wastegate valve according to claim 11, wherein, as considered in a direction perpendicular to the valve element sealing surface, the spring element has a circular outer edge, the radially outer spring element ring region has the form of a circular ring, the spring element opening has an oval form and the radially inner spring element ring region adjoining the spring element opening has the same width everywhere.

15. The turbocharger wastegate valve according to claim 11 comprising a spindle, which is held so as to be rotatable about a spindle longitudinal axis and is fixedly connected to the valve element carrier, such that the valve element is movable between a closed position and an open position by rotation of the spindle, and a valve seat surrounding an exhaust-gas through-opening, against which valve seat the valve element sealing surface bears with a sealing pressure in an at least substantially gastight manner in the closed position of the valve element, wherein by means of the valve element carrier, the valve element is held in such a way that, as considered in the direction of the spindle longitudinal axis, by rotating the spindle the plane defined by the valve element sealing surface is pivotable about the spindle longitudinal axis through a pivot angle range, the range limits of which are defined by the closed position and the open position of the valve element and which defines a pivot angle plane extending perpendicularly to the spindle longitudinal axis and to the plane of the valve element sealing surface, in which pivot angle plane the longitudinal axis of the valve element shaft lies, and wherein the spring element is held on the valve element shaft such that the two first longitudinal portions of the spring element transition region are traversed by the pivot angle plane and are arranged opposite one another with respect to the spring element opening.

* * * * *